US012715554B2

(12) United States Patent
Crawford et al.

(10) Patent No.: US 12,715,554 B2
(45) Date of Patent: Aug. 25, 2026

(54) SYSTEMS AND METHODS FOR CONTROLLING A WATERCRAFT IN RESPONSE TO A FISH BITE

(71) Applicant: Navico, Inc., Tulsa, OK (US)

(72) Inventors: Christopher D. Crawford, Bixby, OK (US); Caleb John VanSomeren, Oakfield, WI (US); Laurence Trevor Bates, Auckland (NZ)

(73) Assignee: Navico, Inc., Tulsa, OK (US)

( * ) Notice: Subject to any disclaimer, the term of this patent is extended or adjusted under 35 U.S.C. 154(b) by 764 days.

(21) Appl. No.: 18/158,028

(22) Filed: Jan. 23, 2023

(65) Prior Publication Data

US 2024/0246643 A1 Jul. 25, 2024

(51) Int. Cl.
*B63B 34/00* (2020.01)
*B63H 20/00* (2006.01)
(Continued)

(52) U.S. Cl.
CPC ........... *B63B 34/05* (2020.02); *B63H 20/007* (2013.01); *B63H 21/21* (2013.01); *A01K 97/125* (2013.01);
(Continued)

(58) Field of Classification Search
CPC ..... B63B 34/05; B63B 2201/18; B63B 35/14; B63H 20/007; B63H 21/21; B63H 2021/216; A01K 97/00; A01K 97/125
See application file for complete search history.

(56) References Cited

U.S. PATENT DOCUMENTS 3,159,806 A 12/1964 Piasecki
3,304,532 A 2/1967 Nelkin
(Continued)

FOREIGN PATENT DOCUMENTS

CN 203681844 U 7/2014
CN 104849717 A 8/2015
(Continued)

OTHER PUBLICATIONS

Anderson, Karl "Boat Handling Tips" Marlin Magazine, retrieved from https://www.marlinmag.com/boat-handling-tips/, published 2015 (Year: 2015).*
(Continued)

*Primary Examiner* — Andrew Polay
(74) *Attorney, Agent, or Firm* — Nelson Mullins Riley & Scarborough LLP

(57) ABSTRACT

Example systems and methods are provided herein for controlling a watercraft in response to a bite on a fishing line. A system includes a memory and a processor, and the processor is configured to receive data via user input or one or more sensors to determine whether a fish has bitten on a fishing line. In response to a determination that the fish has bitten on the fishing line, the processor causes the watercraft to operate according to a fish-on operation, which includes at least one of altering a speed of the watercraft, altering a direction of the watercraft, altering a rate of change of the speed of the watercraft, altering a direction of a trolling motor, notifying other watercrafts, or engaging an autopilot to navigate the watercraft according to a preset route. The fish-on operation is designed to aid a user in catching the fish.

19 Claims, 10 Drawing Sheets

(51) Int. Cl.
*B63H 21/21* (2006.01)
*A01K 97/12* (2006.01)

(52) U.S. Cl.
CPC .... *B63B 2201/18* (2013.01); *B63H 2021/216* (2013.01)

(56) References Cited

U.S. PATENT DOCUMENTS 3,417,369 A 12/1968 Richard
3,451,038 A 6/1969 Maass
3,761,873 A 9/1973 Hopkin
3,975,704 A 8/1976 Klein
4,096,484 A 6/1978 Ferre et al.
4,164,379 A 8/1979 Denman
4,281,427 A 8/1981 Petters
4,686,659 A 8/1987 Yamamoto
4,893,286 A 1/1990 Cobb
4,953,147 A 8/1990 Cobb
5,483,767 A 1/1996 Langer
6,909,669 B1 6/2005 Yankielun et al.
7,187,320 B1 3/2007 Yang
7,768,875 B2 8/2010 Iida et al.
7,813,224 B2 10/2010 Krumhansl et al.
8,300,499 B2 10/2012 Coleman et al.
8,305,840 B2 11/2012 Maguire
9,110,467 B2 8/2015 Yuet et al.
9,182,234 B2 11/2015 Ninomiya et al.
9,596,839 B2 3/2017 Bailey
10,251,382 B2 4/2019 Bailey
10,383,322 B2 8/2019 Gaynor
10,451,732 B2 10/2019 Laster
10,481,259 B2 11/2019 Langford-wood
10,952,420 B2 3/2021 Bailey
2003/0202426 A1 10/2003 Ishihara et al.
2004/0004904 A1 1/2004 Betts
2004/0068371 A1 4/2004 Estep
2006/0159524 A1 7/2006 Thompson et al.
2006/0238383 A1 10/2006 Kimchi et al.
2007/0147173 A1 6/2007 Park
2008/0236275 A1 10/2008 Breed et al.
2008/0282817 A1 11/2008 Breed
2009/0058593 A1 3/2009 Breed
2009/0231953 A1 9/2009 Welker et al.
2010/0085198 A1 4/2010 Boss et al.
2010/0157736 A1 6/2010 Riordan et al.
2010/0199225 A1 8/2010 Coleman et al.
2011/0132093 A1 6/2011 Citta
2011/0279673 A1 11/2011 Teich et al.
2013/0085630 A1 4/2013 Ninomiya et al.
2013/0271301 A1 10/2013 Kabel et al.
2014/0071167 A1 3/2014 Lauenstein et al.
2014/0237409 A1 8/2014 Okubo et al.
2015/0025718 A1 1/2015 Miichi et al.
2015/0138923 A1 5/2015 Abernathy et al.
2015/0138924 A1 5/2015 Schaefers et al.
2015/0293213 A1 10/2015 Felber
2015/0330803 A1 11/2015 Okuda et al.
2016/0121989 A1 5/2016 Okuda
2016/0170013 A1 6/2016 Laster
2016/0170022 A1 6/2016 Laster
2017/0171316 A1 6/2017 Laster et al.
2017/0210449 A1 7/2017 Frisbie et al.
2018/0295829 A1* 10/2018 Blackadar ................ G06N 5/04
2019/0000049 A1* 1/2019 Bonutti .................. A01K 73/10
2019/0120959 A1 4/2019 Laster et al.

FOREIGN PATENT DOCUMENTS

CN 103448877 B 11/2015
CN 208021679 U 10/2018
CN 109878641 A 6/2019
CN 115195947 A 10/2022

OTHER PUBLICATIONS

"Deeper"; https://deepersonar.com/en; (retrieved May 22, 2017).
"Deeper"; Deeper, UAB; deeper.eu; 2012-2016; (retrieved May 22, 2017).
"Humminbird RF"; www.humminbird/com/freshwater/home; 2017; (retrieved May 22, 2017).
"Vexilar SonarPhone"; vexilar.com; 2017; (retrieved May 22, 2017).

* cited by examiner 158
160
148
150
152
154
156
162
142
144
146
140

160
148
152
154
156
150
158
162
140
142
144
146

SYSTEMS AND METHODS FOR CONTROLLING A WATERCRAFT IN RESPONSE TO A FISH BITE

FIELD OF THE INVENTION

Example embodiments of the present invention generally relate to controlling a watercraft and, more particularly to, controlling a watercraft in response to a bite on a fishing line associated with the watercraft.

BACKGROUND

When fishing, a fisherperson is often trolling along with one or more fishing lines in the water waiting for a fish to bite. To maximize the possibility of a bite, the watercraft may operate according to certain parameters, such as at a certain speed and/or in a certain direction. However, the speed of operation and/or direction of travel while trolling may be different than an ideal speed for actually "landing" (e.g., successfully reeling in a fish that has bit on a fishing line). Notably, occurrence of a fish bite results in a chaotic moment that can be difficult to manage. Such factors make it difficult to land a fish that has bit on the fishing line.

BRIEF SUMMARY

Some example embodiments of the present invention include systems and methods for controlling a watercraft in response to a fish biting on a fishing line that is associated with the watercraft. As noted above, there may be differences between how a watercraft is currently operating and how the watercraft could operate to maximize the chance that the fisherperson lands the fish that bit on their fishing line. Thus, a user may wish to change certain parameters of a watercraft, such as the speed and/or the direction of the watercraft (among other parameters) to optimize the operational settings of the watercraft to make conditions ideal for catching and reeling the fish into the watercraft.

As further noted above however, in the chaotic moments of a fish bite, the user has a limited amount of time and attention. In this regard, in the amount of time and mental concentration it would take for the user to manually adjust parameters such as the speed, direction, etc. of the watercraft, the fish may become released from the fishing line. Further, in situations in which multiple users are on the watercraft, it can be difficult to quickly communicate amongst the users to accomplish the necessary parameter changes before the fish becomes released. Thus, various embodiments of the present invention provide systems and methods that automatically aid a user in controlling a watercraft in response to a fish biting on a fishing line associated with the watercraft.

Some example systems include a processor and a memory, and the processor may be configured to receive data from either a user or a sensor to determine whether a fish has bitten on a fishing line associated with the watercraft. For example, a user may press a button or speak an audio command to cause the processor to determine that a fish has bitten on a fishing line, or the processor may automatically detect a bite on the fishing line based on data from, e.g., an accelerometer. Other systems and methods for determining whether a fish has bitten on a fishing line associated with the watercraft are also contemplated. The processor may also be configured to cause performance of a fish-on operation, which is a procedure or sequence that is pre-programmed or automated to cause the watercraft to operate under certain parameters in order to aid in catching and reeling the fish into the watercraft. The fish-on operation may include actions such as altering a speed, direction, and/or rate of change of speed of the watercraft. Additionally or alternatively, the fish-on operation may include actions such as altering a direction of a trolling motor, notifying other watercrafts, and/or engaging an autopilot to navigate the watercraft according to a preset route.

In some example embodiments, systems and methods may include determining the fish-on operation based on a fish type. The fish type may be inputted by a user before, during, or after the system or method has determined that a fish has bitten on a fishing line associated with the watercraft. In some example embodiments, the fish-on operation may be pre-programmed to cause the watercraft to slow down and/or move in a direction that is straight. In other embodiments, however, the fish-on operation may be pre-programmed to cause the watercraft to move in a direction that may not be straight in order to, for example, circumvent certain obstacles or navigation limitations, to circle a nearby piece of land, or to avoid other vessels. In some embodiments, the fish-on operation may be pre-programmed to cause the watercraft to follow a turn pattern, which may or may not be time-delayed, in order to aid in catching the fish. In some embodiments, the turn pattern may be automatically generated based on a detected wind condition or based on chart data. In other embodiments, the turn pattern may be predetermined based on, e.g., a fish type. The fish-on operation may also be determined based on location, such that different operations are performed depending on a current location of the watercraft. Further, in some embodiments, the fish-on operation may include activation of a sonar system and adjusting such sonar system in order to produce a live sonar image of the underwater environment where the fish has been detected as biting on the fishing line-thereby allowing the fisherperson to watch the fish and/or fishing line.

In an example embodiment, a system is provided for controlling a watercraft. The system includes a processor and a memory including computer executable instructions. The computer executable instructions are configured to, when executed by the processor, cause the processor to determine receipt of at least one of user input or sensor input indicating occurrence of a fish-on event. The fish-on event corresponds to occurrence of a bite on a fishing line associated with the watercraft. The computer executable instructions are also configured to, when executed by the processor, cause the processor to cause, in response to determination of the receipt of the at least one user input or sensor input indicating the occurrence of the fish-on event, performance of a fish-on operation. The fish-on operation includes at least one of altering a speed of the watercraft, altering a direction of the watercraft, altering a rate of change of the speed of the watercraft, altering a direction of a trolling motor, notifying other watercrafts, or engaging an autopilot to navigate the watercraft according to a preset route. Performance of the fish-on operation is designed to aid in a user landing a fish that bit on the fishing line.

In some embodiments, the fish-on operation may be determined based on a fish type inputted by a user.

In some embodiments, the fish type may be inputted by the user before the occurrence of the fish-on event.

In some embodiments, the fish type may be inputted by the user during the occurrence of the fish-on event.

In some embodiments, a degree of altering at least one of the speed of the watercraft, the direction of the watercraft, the rate of change of the speed of the watercraft, or the direction of the trolling motor may be based on a fish type inputted by a user.

In some embodiments, the receipt of user input may correspond to a button being pressed.

In some embodiments, the button may be attached to the trolling motor or a foot pedal.

In some embodiments, the button may be attached to a remote control.

In some embodiments, the receipt of user input may correspond to detecting a predetermined voice command.

In some embodiments, altering the speed of the watercraft may include reducing the speed of the watercraft.

In some embodiments, altering the speed of the watercraft may include reducing the speed of the watercraft by at least 10 percent.

In some embodiments, altering the direction of the watercraft may include causing at least one of the watercraft or the trolling motor to move in a direction that is straight.

In some embodiments, altering the direction of the watercraft may include a turn pattern.

In some embodiments, the turn pattern may be time delayed.

In some embodiments, the turn pattern may be determined based on at least one of a detected wind condition or chart data indicating at least one of a detected obstacle or a navigation limitation.

In some embodiments, the fish-on operation may be determined based on a preset location, and the processor may be further configured to determine a current location of the watercraft and determine the fish-on operation based on the current location matching the preset location.

In some embodiments, the sensor input indicating the occurrence of the fish-on event may include input from an accelerometer.

In some embodiments, the fish-on operation may include activating a sonar system, adjusting a position of the sonar system based on a detected location of the occurrence of the bite on the fishing line, and presenting a live sonar image based on sonar return data from the sonar system. The live sonar image may provide a view of the fish involved with the fish-on event.

In another example embodiment, a device is provided for controlling a watercraft. The device includes a processor and a memory including computer executable instructions. The computer executable instructions are configured to, when executed by the processor, cause the processor to determine receipt of at least one of user input or sensor input indicating occurrence of a fish-on event. The fish-on event corresponds to occurrence of a bite on a fishing line associated with the watercraft. The computer executable instructions are also configured to, when executed by the processor, cause the processor to cause, in response to determination of the receipt of the at least one user input or sensor input indicating the occurrence of the fish-on event, performance of a fish-on operation. The fish-on operation includes at least one of altering a speed of the watercraft, altering a direction of the watercraft, altering a rate of change of the speed of the watercraft, altering a direction of a trolling motor, notifying other watercrafts, or engaging an autopilot to navigate the watercraft according to a preset route. Performance of the fish-on operation is designed to aid in a user landing a fish that bit on the fishing line.

In another example embodiment, a method is provided for controlling a watercraft. The method includes determining receipt of at least one of user input or sensor input indicating occurrence of a fish-on event. The fish-on event corresponds to occurrence of a bite on a fishing line associated with the watercraft. The method also includes causing, in response to determination of the receipt of the at least one user input or sensor input indicating the occurrence of the fish-on event, performance of a fish-on operation. The fish-on operation includes at least one of altering a speed of the watercraft, altering a direction of the watercraft, altering a rate of change of the speed of the watercraft, altering a direction of a trolling motor, notifying other watercrafts, or engaging an autopilot to navigate the watercraft according to a preset route. Performance of the fish-on operation is designed to aid in a user landing a fish that bit on the fishing line.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION

Figure 1:
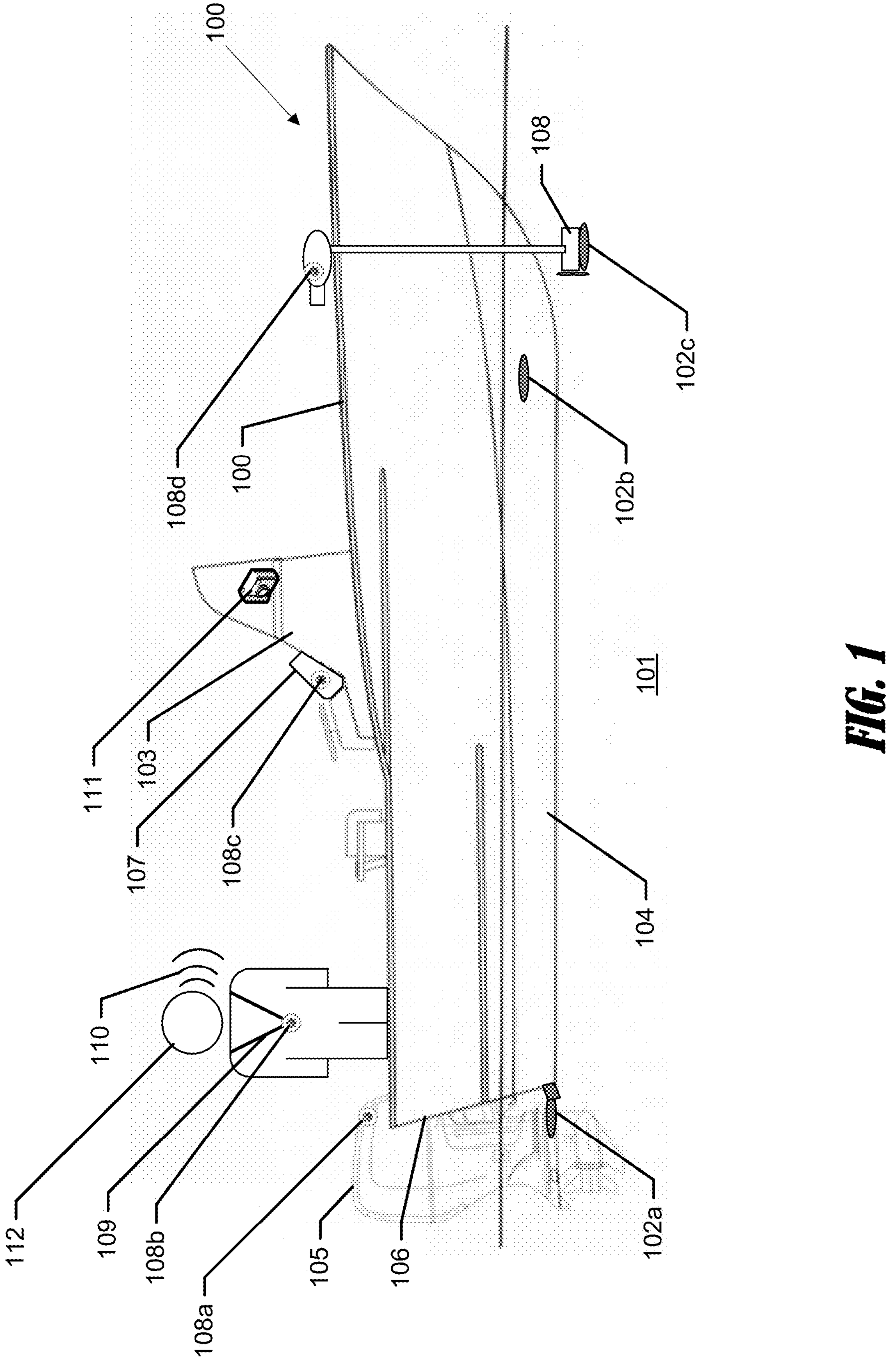
FIG. 1 shows an example watercraft capable of being controlled by a fish-on operation, in accordance with some embodiments described herein.

Exemplary embodiments of the present disclosure will be described more fully hereinafter with reference to the accompanying drawings, in which some, but not all embodiments of the present disclosure are shown. Indeed, the present disclosure may be embodied in many different forms and should not be construed as limited to the exemplary embodiments set forth herein; rather, these embodiments are provided so that this disclosure will satisfy applicable legal requirements. Like reference numerals refer to like elements throughout.

As depicted in FIG. 1, a watercraft 100 (e.g., a vessel) configured to traverse a marine environment, e.g., body of water 101, may use one or more buttons 108*a*, 108*b*, 108*c*, or 108*d* disposed on and/or proximate to the watercraft. The watercraft 100 may be a surface watercraft, a submersible watercraft, or any other implementation known to those skilled in the art. The one or more buttons 108*a*, 108*b*, 108*c*, or 108*d* may each be configured to identify a fish-on event and to initiate a fish-on operation, which is a collection of one or more actions that operate to control a watercraft when a fish-on event is detected.

Depending on the configuration, the watercraft 100 may include a main propulsion motor 105, such as an outboard or inboard motor. Additionally, the watercraft 100 may include a trolling motor 108 configured to propel the watercraft 100 or maintain a position. One or more transducer assemblies (e.g., 102*a*, 102*b*, and/or 102*c*) may be mounted in various positions and to various portions of the watercraft 100 and/or equipment associated with the watercraft 100. For example, a transducer assembly may be mounted to the transom 106 of the watercraft 100, such as depicted by transducer assembly 102*a*. A transducer assembly may be mounted to the bottom or side of the hull 104 of the watercraft 100, such as depicted by transducer assembly 102*b*. A transducer assembly may be mounted to the trolling motor 108, such as depicted by transducer assembly 102*c*.

The watercraft 100 may also include one or more marine electronic devices 107, such as may be utilized by a user to interact with, view, or otherwise control various aspects of the watercraft and its various marine systems described herein. In the illustrated embodiment, the marine electronic device 107 is positioned proximate the helm (e.g., steering wheel) of the watercraft 100—although other places on the watercraft 100 are contemplated. Likewise, additionally or alternatively, a user's mobile device may include functionality of a marine electronic device.

The watercraft 100 may also include one or more user input devices. In some embodiments, the one or more user input devices may be buttons (e.g., buttons 108*a*, 108*b*, 108*c*, 108*d*). For example, a user input device may be mounted to the main propulsion motor 105, such as depicted by button 108*a*. A user input device may be available on a remote control (e.g., on a necklace around a user's neck, such as depicted by button 108*b* on necklace 109 hanging around the neck of user 112). A user input device may be available on or near a marine electronic device, such as depicted by button 108*c* on the one or more marine electronic devices 107. A user input device may be mounted on the trolling motor 108, such as depicted by button 108*d*. In other embodiments, the one or more user input devices may be audio receivers capable of receiving and interpreting audio commands (e.g., audio command 110). In some other embodiments, the one or more user input devices may be any other device capable of receiving user input (in any format).

The one or more user input devices may be configured to receive input so as to indicate a fish-on event, and the indication of a fish-on event may be configured to cause operation of a fish-on operation. The fish-on operation may include one or more of various actions that are designed to aid in the user landing (e.g., catching and reeling into the watercraft) a fish that has bitten on a fishing line associated with the watercraft. In some embodiments, the fish-on operation may include at least one of altering a speed of the watercraft, altering a direction of the watercraft, altering a rate of change of the speed of the watercraft, altering a direction of a trolling motor, notifying other watercrafts, or engaging an autopilot to navigate the watercraft according to a preset route. For example, altering the speed of the watercraft may include reducing the speed of the watercraft, e.g., by at least 10%, by at least 15%, by at least 5%, by at least 50%, by at least 0.5 miles per hour (mph), by at least 1 mph, by at least 5 mph, or any other percentage or value, such that the fish that bit on the fishing line can be landed more easily. As another example, additionally or alternatively, the fish-on operation may make such alterations in varying degrees based on, e.g., a detected fish type. Further, the fish-on operation may include an operation to optionally notify other watercrafts of the fish-on event. For example, the fish-on operation may cause an automatic signal (e.g., audio, visual, or radio) to be sent to nearby watercrafts to alert nearby watercrafts of the fish-on event. In embodiments that include this operation in the fish-on operation, however, the automatic signaling may be disabled in select situations such as when users do not want nearby watercrafts to be notified about the fish-on event. In other embodiments, additionally or alternatively, the fish-on operation may include a number of other actions. Further, the actions associated with the fish-on operation may be predetermined by a user, may be determined based on user input, or may be automatically determined based on detected data, among other determinations.

Still referring to FIG. 1, the watercraft 100 may also include a photo or video camera 111 mounted anywhere on or near the watercraft 100. For example, the photo or video camera 111 depicted in FIG. 1 is mounted to the console 103 of the watercraft. The photo or video camera 111 may be configured to move in response to the fish-on event being determined as part of the fish-on operation. For example, the photo or video camera 111 may be configured to turn or adjust such that it captures photo(s) or video of the environment where the fish that has bitten on the fishing line is detected.

Similarly, one or more transducer assemblies (e.g., 102*a*, 102*b*, and/or 102*c*) may be configured to be adjusted in response to a fish-on event being detected. That is, the fish-on operation may include activating a sonar system, such as a sonar system that includes one or more transducer assemblies such as transducer assemblies 102*a*, 102*b*, and/or 102*c*. Accordingly, the fish-on operation might include adjusting a position of the sonar system based on a detected location of the occurrence of the bite on the fishing line and presenting a sonar image based on sonar return data from the sonar system. As an example, a live sonar image may provide a view of the fish involved with the fish-on event.

Figures 2A, 2B:
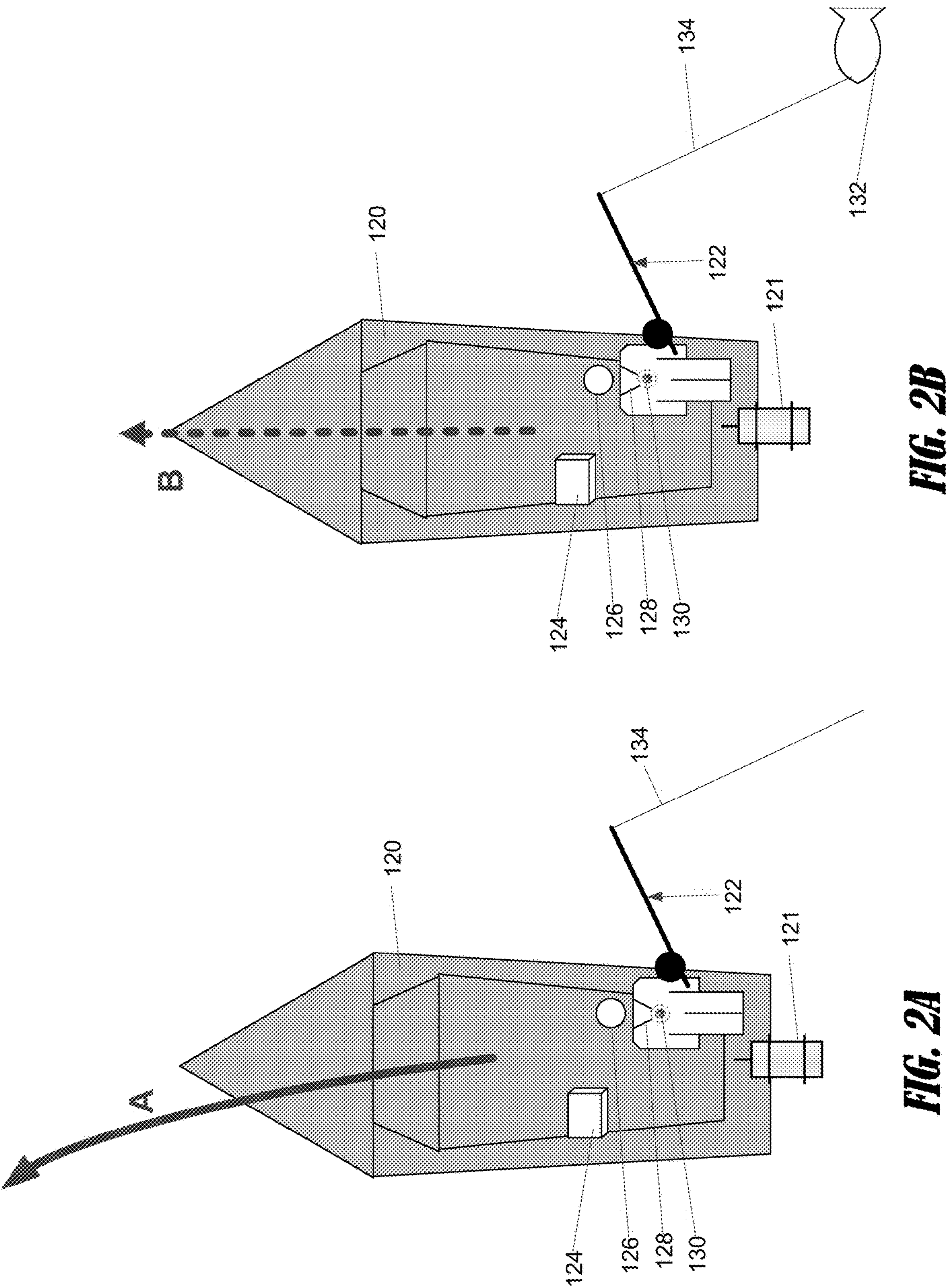
FIGS. 2A-2B show a watercraft subject to an example fish-on operation, in accordance with some embodiments described herein.

FIGS. 2A-2B illustrate a watercraft 120 utilizing an example fish-on operation that changes the direction and the speed of the watercraft 120. The watercraft 120 has a console 124, a motor 121, and a fishing pole 122. The fishing pole 122 has a line 134. In some embodiments, when the button 130, which is located on the necklace 128 on the user 126, is pressed, a fish-on event may be identified, and the fish-on operation may be initiated. In other embodiments, the button 130 may be located elsewhere (such as illustrated in FIG. 1), and in some other embodiments, the fish-on event may be identified by another mechanism, such as an audio command. Once the fish-on event has been identified, the fish-on operation may be initiated to help, e.g., successfully catch fish 132. For example, in the embodiment illustrated in FIG. 2A, the watercraft 120 is traveling in a direction (turning slight left) and speed according to vector A. In the illustration shown in FIG. 2A, there are no bites on the line 134 of the fishing pole 122. In the embodiment illustrated in FIG. 2B, however, there is a bite on the line 134 of the fishing pole 122 by the fish 132, and the button 130 has been pressed, indicating the occurrence of the fish-on event. As a result of the fish-on event being identified, the fish-on operation is initiated in between the illustrations shown in FIG. 2A and FIG. 2B. The fish-on operation causes the watercraft 120 to change from traveling in the direction and speed shown by vector A to traveling in a direction (e.g., straight) and speed (slower) shown by vector B. The change in direction and speed can be accomplished by altering the operation of the motor 121. Additionally or alternatively, the change in direction and speed may be accomplished by altering the operation of a trolling motor or any other propulsion device or system (e.g., a rudder) on the watercraft.

The parameters of the fish-on operation may be programmed by a user at any time, or in other embodiments, the parameters of the fish-on operation may be automatically generated. More specifically, in some embodiments, the user may have the ability to set one or more parameters ahead of time. The user may be able to select a select set of parameters to be executed in all conditions, or the user may be able to set different parameters for different conditions (e.g., different parameters for different fish types, locations, weather conditions, etc.). For example, a user may predetermine different fish-on operations for different fish types, and the user may then be able to select a fish type either before, during, or after the occurrence of the fish-on event. Alternatively, the system may be configured to automatically determine or assume the fish type based on data, such as from an accelerometer, chart data, or other data, and then select the appropriate fish-on operation accordingly. In other embodiments, a user may be able to allow a processor to determine an optimal set of parameters based on detected data, such as current weather conditions, location, and/or detected acceleration of a fish, among other data. For example, the processor may be configured to determine a current location of the watercraft and then determine the fish-on operation based on the current location matching a preset location, which has an associated predetermined fish-on operation.

Figures 3A, 3B:
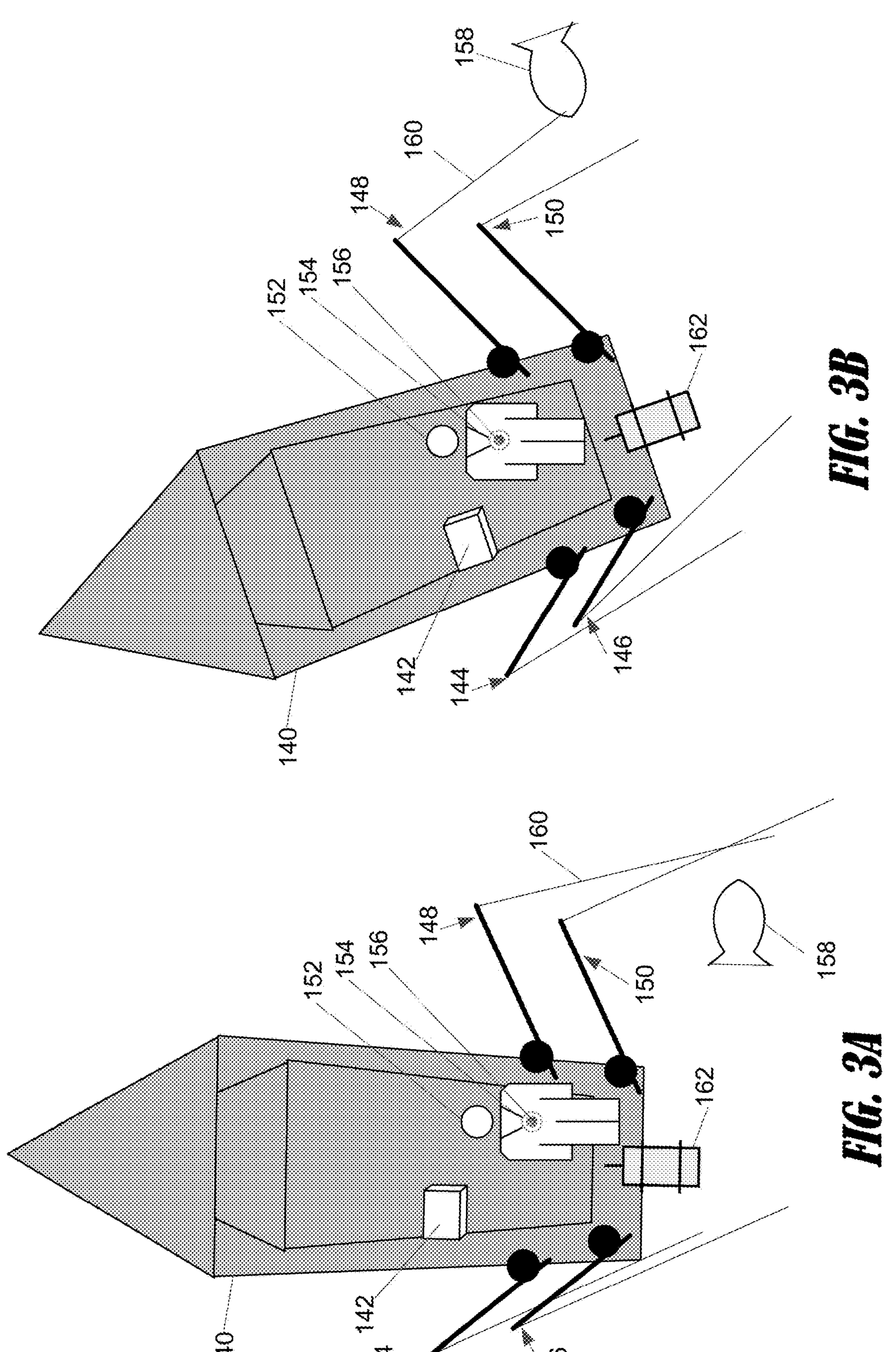
FIGS. 3A-3B show another watercraft subject to another example fish-on operation, in accordance with some embodiments described herein.

FIGS. 3A-3B illustrate a watercraft 140 with another example fish-on operation that changes the direction and the speed of the watercraft 140. The watercraft 140 has a console 142, a motor 162, and fishing poles 144, 146, 148, and 150. The fishing pole 148 has a line 160. In some embodiments, when the button 156, which is located on the necklace 154 on the user 152, is pressed, a fish-on event may be identified, and the fish-on operation may be instigated. In other embodiments, the button 156 may be located elsewhere (such as illustrated in FIG. 1), and in some other embodiments, the fish-on event may be identified by another mechanism, such as an audio command. Once the fish-on event has been identified, the fish-on operation may be initiated to help catch a fish 158. For example, in the embodiment illustrated in FIG. 3A, the watercraft 140 is positioned such that the lines of fishing poles 144, 146, 148, and 150 are overlapping. In the embodiment shown in FIG. 3A, the watercraft may be traveling in any direction and/or speed, or it may not be moving at all. Further, in the illustration shown in FIG. 3A, there are no bites on the line 160 of the fishing pole 148. In the embodiment illustrated in FIG. 3B, however, there is a bite on the line 160 of the fishing pole 148 by the fish 158, and the button 156 has been pressed, indicating the occurrence of a fish-on event. As a result of the fish-on event being identified, the fish-on operation is initiated in between the illustrations shown in FIG. 3A and FIG. 3B. The fish-on operation causes the watercraft 140 to change from traveling in the direction and speed shown in FIG. 3A to traveling in a direction and speed shown in FIG. 3B such that the lines of the fishing poles 144, 146, 148, and 150 are no longer overlapping. The fish-on operation shown in FIGS. 3A-3B may be pre-programmed to untangle multiple fishing pole line by simply turning the watercraft 140 in a predetermined direction, or it may be configured to detect overlapping lines and adjust a route of the watercraft 140 accordingly.

In some embodiments, the fish-on operation may be configured to alter the direction of the watercraft to follow a turn pattern. For example, the fish-on operation may be configured such that the watercraft turns back and forth in a turn pattern so that the fish can be caught and reeled into the watercraft more easily. Alternatively, the turn pattern may be configured based on detected or expected environmental conditions. In some embodiments, such a turn pattern may be time delayed. Further, in some embodiments, the turn pattern may be determined based on, for example, a detected wind condition or chart data indicating a detected obstacle or a navigation limitation.

Figure 4:
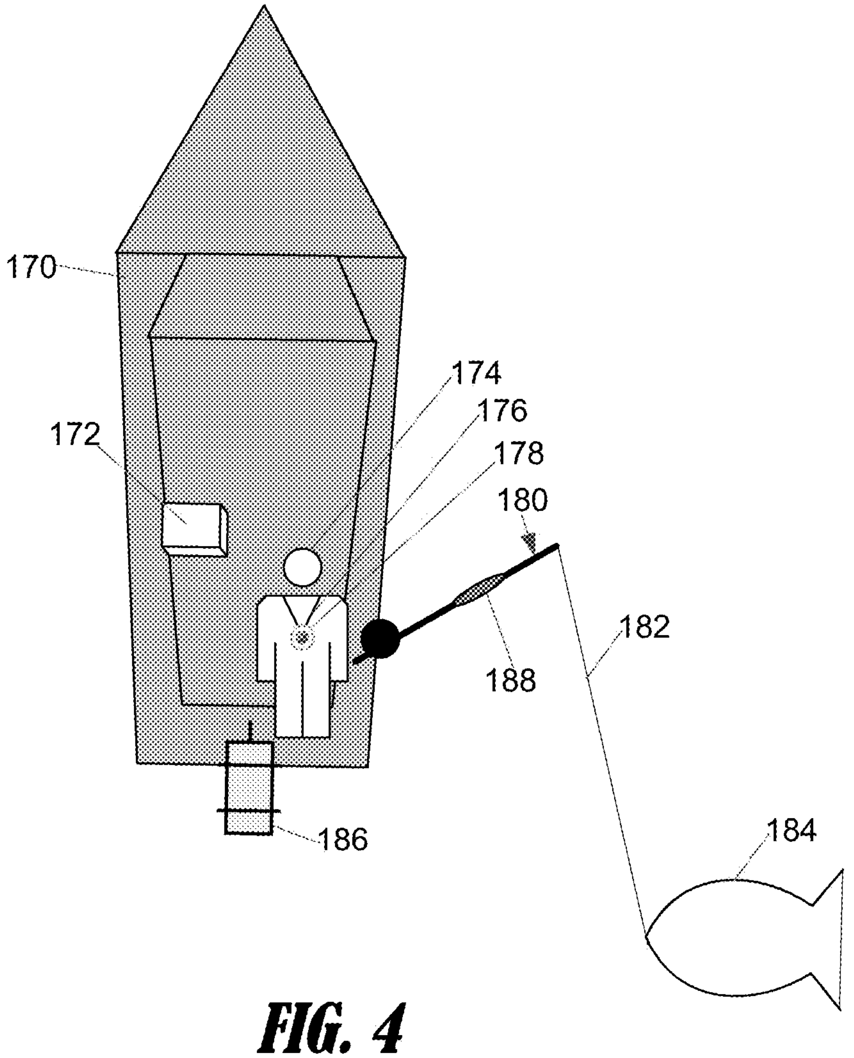
FIG. 4 shows an example watercraft with a fishing line having an accelerometer that is connected to a fish-on operation, in accordance with some embodiments described herein.

FIG. 4 illustrates a watercraft 170 with another example fish-on operation that incorporates an accelerometer 188. The watercraft 170 has a console 172, a motor 186, and a fishing pole 180. The fishing pole 180 has a line 182, and in the embodiment shown in FIG. 4, a fish 184 has bitten on the line 182 of the fishing pole 180. In some embodiments, the accelerometer may be placed anywhere on or near the watercraft. In the embodiment shown in FIG. 4, the accelerometer 188 is positioned on fishing pole 180 and is configured to measure an acceleration change when a fish 184 bites the line 182. In some embodiments, a fish-on event may be indicated by the pressing of a button such as button 178, which is on a necklace 176 on a user 174. In other embodiments, the button 178 may be located elsewhere (such as illustrated in FIG. 1), and in some other embodiments, the fish-on event may be identified by another mechanism, such as an audio command. Further, in embodiments with an accelerometer such as accelerometer 188, the fish-on event may be determined automatically without any user input having been received. For example, the fish-on event may be determined automatically when the accelerometer detects a change in acceleration that satisfies a predetermined threshold. In the embodiment shown in FIG. 4, the fish-on event may be automatically determined when the accelerometer 188 detects a change in acceleration that corresponds to a selected fish type or a desired acceleration that was previously indicated by a user. Further, the fish-on event may be detected by either the button 178 or the accelerometer 188 in the same embodiment.

Figure 5A:
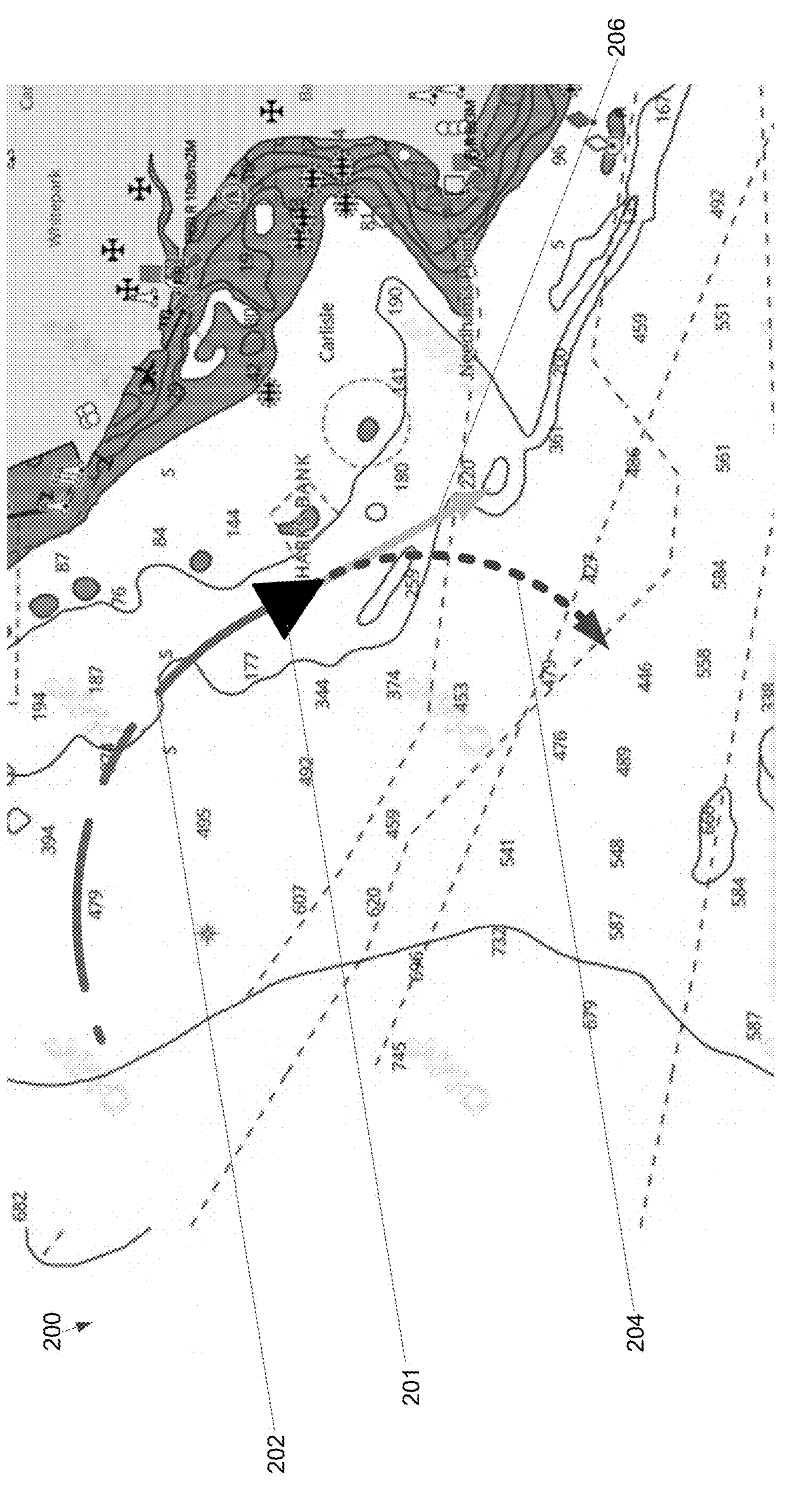
FIG. 5A shows an example chart for a user interface, wherein the chart includes an example watercraft route associated with a fish-on operation, in accordance with some embodiments described herein.
Figure 5B:
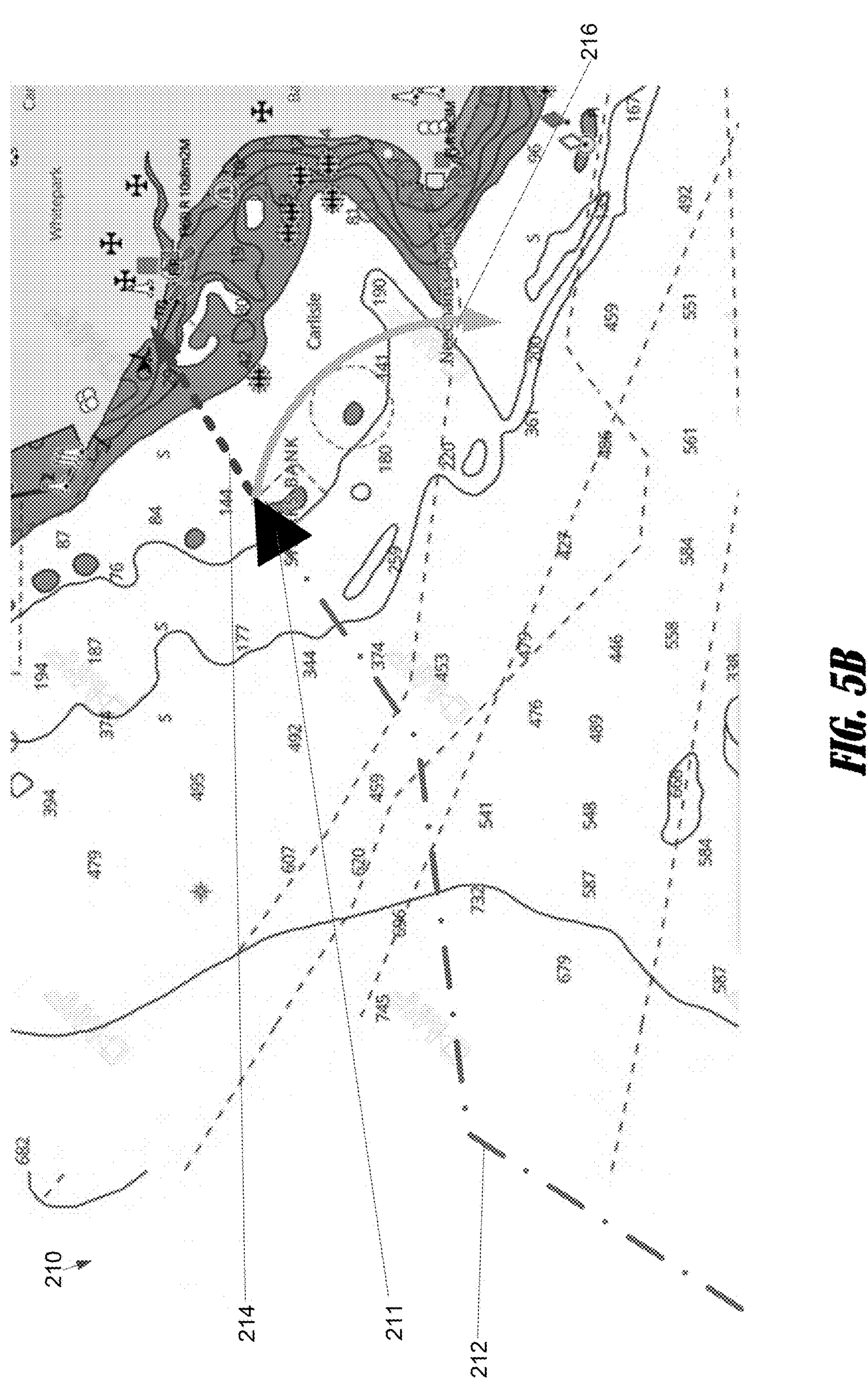
FIG. 5B shows the example chart, wherein the chart includes another example watercraft route associated with a fish-on operation, in accordance with some embodiments described herein.
Figure 5C:
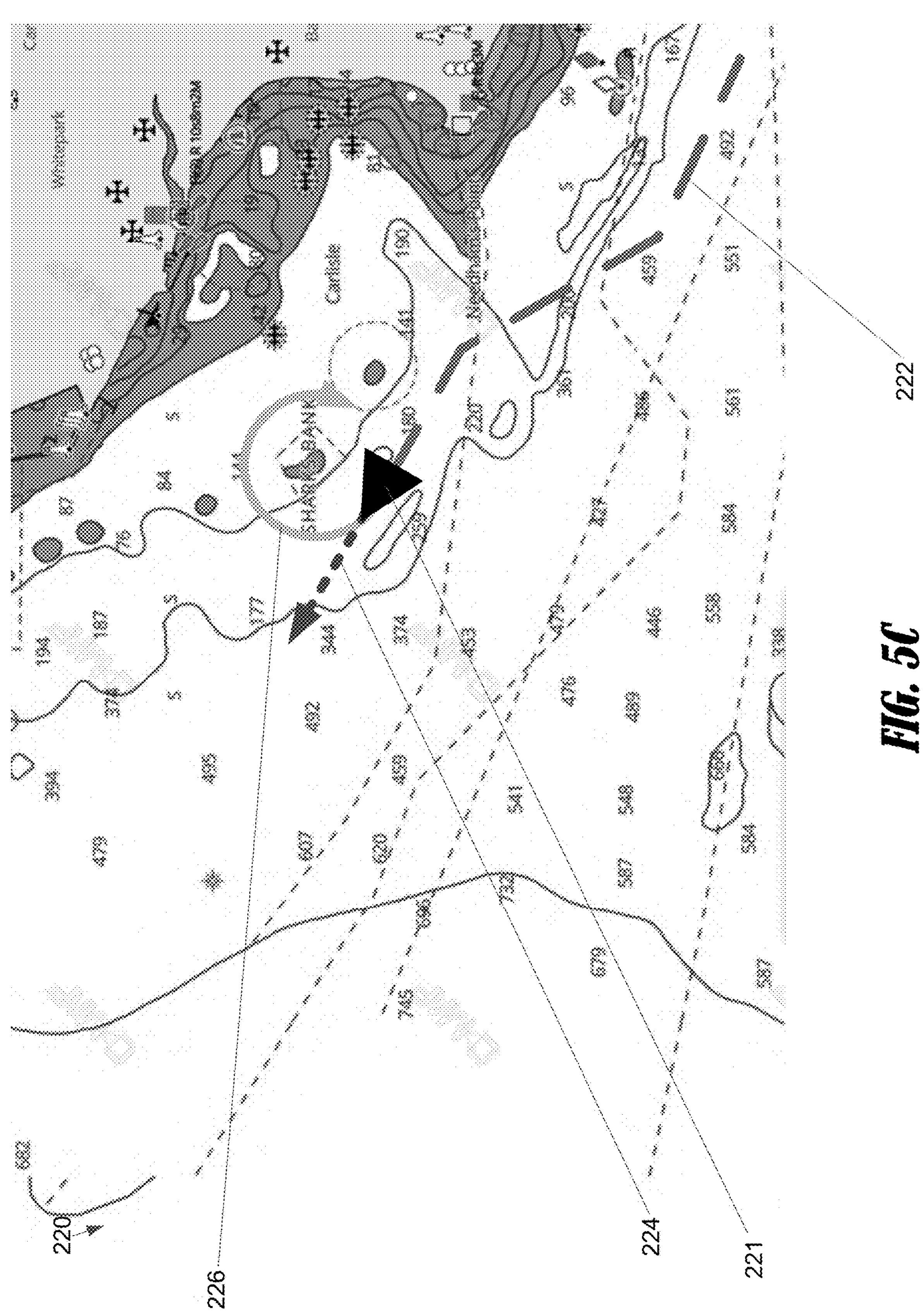
FIG. 5C shows the example chart, wherein the chart includes another example watercraft route associated with a fish-on operation, in accordance with some embodiments described herein.

FIGS. 5A-5C illustrate example routes that may be taken by a watercraft as a result of a fish-on event being indicated and/or detected. For example, FIG. 5A illustrates an icon 201 indicating a location of the watercraft overtop a chart 200. The path 202 indicates the route that has already been taken by the watercraft in the recent past. The path 204 indicates the route that the watercraft would follow under current conditions. For example, if the watercraft were operating under autopilot navigation, path 204 represents the path that the watercraft would continue to take under such autopilot navigation if no fish-on event were identified. Path 206 represents the path that the watercraft will take upon initiation of the fish-on operation after the fish-on event has been indicated and/or detected. In the example shown in FIG. 5A, the fish-on operation would cause the watercraft to assume the route indicted by path 206, which is straight. The system might also change other parameters, such as speed, along with the direction of the watercraft.

FIG. 5B illustrates an icon 211 indicating a location of the watercraft overtop a chart 210. The path 212 indicates the route that has already been taken by the watercraft in the recent past. The path 214 indicates the route that the watercraft would follow under current conditions. For example, if the watercraft were operating by manual operation by a user prior to the fish-on event being indicated, the watercraft would follow path 214 if the user were to step away from the steering wheel. Alternatively, if the watercraft were operating under an autopilot navigation system prior to the fish-on event being indicated, the watercraft would continue on path 214 under the autopilot navigation system (if no fish-on event were indicated). Path 216 represents the path that the watercraft will take upon initiation of the fish-on operation after the fish-on event has been indicated and/or detected. In the example shown in FIG. 5B, the fish-on operation would cause the watercraft to assume the route indicted by path 216, which curves around detected obstacles and/or navigation limitations. For example, in FIG. 5B, the path 216 curves such that a certain portion of land are avoided. The system might also change other parameters, such as speed, along with the direction of the watercraft.

FIG. 5C illustrates an icon 221 indicating a location of the watercraft overtop a chart 220. The path 222 indicates the route that has already been taken by the watercraft in the recent past. The path 224 indicates the route that the watercraft would follow under current conditions. For example, if the watercraft were operating by manual operation by a user prior to the fish-on event being indicated, the watercraft would follow path 224 if the user were to step away from the steering wheel. Alternatively, if the watercraft were operating under an autopilot navigation system prior to the fish-on event being indicated, the watercraft would continue on path 224 under the autopilot navigation system (if no fish-on event were indicated). Path 226 represents the path that the watercraft will take upon initiation of the fish-on operation after the fish-on event has been indicated and/or detected. In the example shown in FIG. 5C, the fish-on operation would cause the watercraft to assume the route indicted by path 226, which curves around the nearest piece of land. For example, in FIG. 5C, the path 226 curves around the island labeled "SHARK'S BANK." The system might also change other parameters, such as speed, along with the route of the watercraft.

Another example route that may be taken by a watercraft as a result of a fish-on event being indicated and/or detected may be a route that causes the watercraft to avoid nearby vessels. For example, a position of a nearby vessel may be determined using, e.g., an automatic identification system (AIS) and/or radar sensor, and a fish-on operation may be configured to automatically calculate and implement a route that circumvents the nearby vessel upon a determination of a fish-on event. This may be useful to allow users on a watercraft to be able to focus their attention on catching a fish rather than having to monitor for nearby vessels. In other embodiments, the fish-on operation may be configured to calculate and/or implement any other route.

Figure 6:
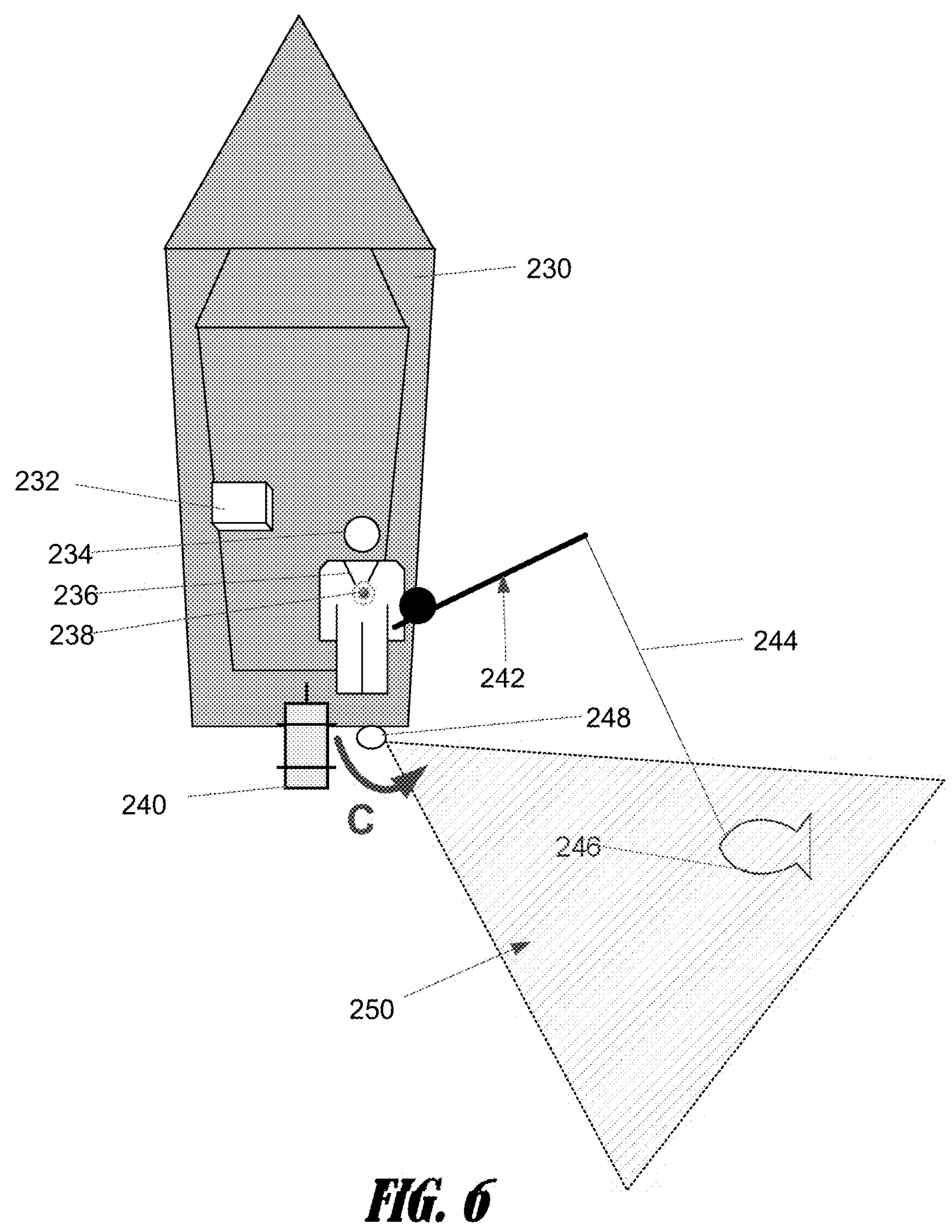
FIG. 6 shows an example watercraft subject to another example fish-on operation to steer a sonar system to cover the fish bite, in accordance with some embodiments described herein.

FIG. 6 illustrates a watercraft 230 with another example fish-on operation that incorporates a steerable transducer assembly 248 with sonar coverage 250. The watercraft 230 has a console 232, a motor 240, and a fishing pole 242. The fishing pole 242 has a line 244, and in the embodiment shown in FIG. 6, a fish 246 has bitten on the line 244 of the fishing pole 242. In some embodiments, a transducer assembly such as steerable transducer assembly 248 may be placed anywhere on or near the watercraft. In the embodiment shown in FIG. 6, the steerable transducer assembly 248 is positioned on the stern of the watercraft 230 and is configured to be adjustable (e.g., as a part of the fish-on operation) along direction C such that the sonar coverage 250 points toward a location of a fish 246 when the fish 246 bites the line 244. This would allow the user to view the fish and/or fishing line via the sonar imagery, which may aid in landing the fish.

In some embodiments, the steerable transducer assembly 248 may be controlled by user input such as through an audio command or through a marine electronic device. In other embodiments, a system may be configured to detect a position of a fish such as the fish 246 (e.g., using a camera, sonar, or motion sensor) and then automatically adjust the steerable transducer assembly 248 accordingly such that the sonar coverage 250 covers the area containing the fish 246.

Referring still to FIG. 6, a fish-on event may be indicated by the pressing of a button such as button 238, which is on a necklace 236 on a user 234. In other embodiments, the button 238 may be located elsewhere (such as illustrated in FIG. 1), and in some other embodiments, the fish-on event may be identified by another mechanism, such as an audio command. Further, in embodiments with a sonar transducer assembly such as steerable transducer assembly 248, the fish-on event may be determined automatically without any user input having been received. For example, the fish-on event may be determined automatically when the steerable sonar transducer assembly 248 detects a fish being caught. Further, the fish-on event may be detected by either the button 238 or the steerable transducer assembly 248 in the same embodiment.

Example System Architecture

Figure 7:
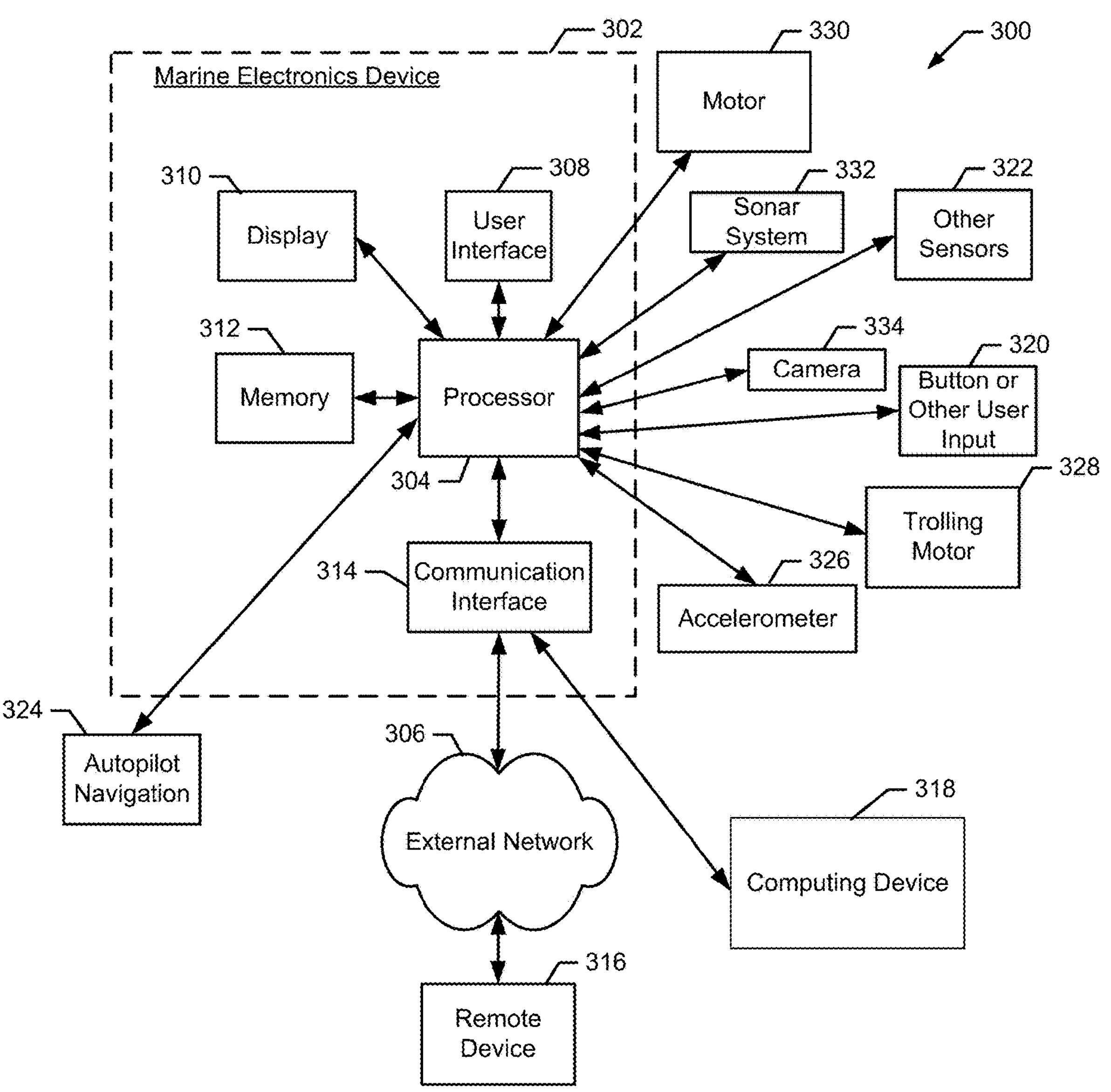
FIG. 7 is a block diagram of an example system capable of executing a fish-on operation, in accordance with some embodiments described herein.

FIG. 7 shows a block diagram of an example system 300 capable for use with several embodiments of the present disclosure. As shown, the system 300 may include a number of different modules or components, each of which may comprise any device or means embodied in either hardware, software, or a combination of hardware and software configured to perform one or more corresponding functions. For example, the system 300 may include a marine electronics device 302 (e.g., controller) and various sensors/system.

The marine electronics device 302, controller, remote control, MFD, and/or user interface display may include a processor 304, a memory 312, a communication interface 314, a user interface 308, and a display 310. The processor 304 may be in communication with one or more devices such as motor 330, sonar system 332, camera 334, trolling motor 328, accelerometer 326, button or other user input 320, and/or other sensors 322 to determine whether a fish-on event has occurred and to subsequently initiate and execute a fish-on operation. For example, the button or other user input 320 may communicate to the processor that a fish-on event has occurred, and the processor may then send signals to the motor 330, the sonar system 332, the camera 334, and the trolling motor 328 to execute a certain fish-on operation that was pre-programmed by the user or that was automatically generated by the processor based on data received from sources such as accelerometer 326 and/or other sensors 322.

In some embodiments, the system 300 may be configured to receive, process, and display various types of marine data. In some embodiments, the system 300 may include one or more processors 304 and a memory 312. Additionally, the system 300 may include one or more components that are configured to gather marine data or perform marine features. In such a regard, the processor 304 may be configured to process the marine data and generate one or more images corresponding to the marine data for display on the screen that is integrated in the marine electronics device. Further, the system 300 may be configured to communicate with various internal or external components (e.g., through the communication interface 314), such as to provide instructions related to the marine data.

The processor 304 may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein, or a combination thereof) thereby configuring the device or circuitry to perform the corresponding functions of the processor 304 as described herein. In this regard, the processor 304 may be configured to analyze electrical signals communicated thereto to provide, e.g., display data to the display to indicate the direction of the sonar system 332 relative to the marine vessel or to indicate a change in acceleration detected by the accelerometer 326.

In some example embodiments, the processor 304 may be configured to receive sonar data indicative of the size, location, shape, etc. of objects detected by the system 300. For example, the processor 304 may be configured to adjust a position of the sonar system 332 according to a fish-on operation, receive sonar return data, and process the sonar return data to generate sonar image data for display to a user (e.g., on display 310). In some embodiments, the processor 304 may be further configured to implement signal processing and/or enhancement features to improve the display characteristics, data, and/or images, to collect and/or process additional data (e.g., time, temperature, GPS information, waypoint designations), and/or to filter extraneous data to better analyze the collected data. In some embodiments, the processor 304 may further implement notices and/or alarms (e.g., alerts determined or adjusted by a user) to reflect depth measurements, the presence of fish, the proximity of other marine vessels, status or notifications for peripheral devices/systems, etc. The processor 304 and memory 312 may form processing circuitry.

The memory 312 may be configured to store instructions, computer program code, marine data (e.g., sonar data, chart data, location/position data), and/or other data associated with the system 300 in a non-transitory computer readable medium for use by the processor, for example.

The system 300 may also include one or more communications modules configured to communicate via any of many known manners, such as via a network, for example. The processing circuitry and communication interface 314 may form a processing circuitry/communication interface. The communication interface 314 may be configured to enable connections to external systems (e.g., an external network 306 or one or more remote controls, such as a handheld remote control, marine electronics device, foot pedal, or other remote computing device). In this regard, the communication interface (e.g., 314) may include one or more of a plurality of different communication backbones or frameworks, such as Ethernet, USB, CAN, NMEA 2000, GPS, Sonar, cellular, WiFi, and/or other suitable networks, for example. In this manner, the processor 304 may retrieve stored data from a remote, external server via the external network 306 in addition to or as an alternative to the onboard memory 312. The network may also support other data sources, including GPS, autopilot, engine data, compass, radar, etc. Numerous other peripheral, remote devices such as one or more wired or wireless multi-function displays may be connected to the system 300.

The processor 304 may configure the device and/or circuitry to perform the corresponding functions of the processor 304 as described herein. In this regard, the processor 304 may be configured to analyze electrical signals communicated thereto to provide, for example, various features/functions described herein.

In some embodiments, the system 300 may be configured to determine the location of the marine vessel, such as through a location sensor. The system 300 may comprise, or be associated with, a navigation system that includes the location sensor. For example, the location sensor may comprise a GPS, bottom contour, inertial navigation system, such as a micro-electro-mechanical system (MEMS) sensor, a ring laser gyroscope, or the like, or other location detection system. In such a regard, the processor 304 may be configured to act as a navigation system. For example, the processor 304 may generate at least one waypoint and, in some cases, generate an image of a chart along with the waypoint for display by the screen. Additionally or alternatively, the processor may generate one or more routes associated with the watercraft. The location of the vessel, waypoints, and/or routes may be displayed on a navigation chart on a display remote from the system 300. Further, additional navigation features (e.g., providing directions, weather information, etc.) are also contemplated.

In addition to position, navigation, and sonar data, example embodiments of the present disclosure contemplate receipt, processing, and generation of images that include other marine data. For example, the display 310 and/or user interface 308 may be configured to display images associated with vessel or motor status (e.g., gauges) or other marine data.

In any of the embodiments, the display 310 may be configured to display an indication of the current direction of the marine vessel.

The display 310 may be configured to display images and may include or otherwise be in communication with a user interface 308 configured to receive input from a user. The display 310 may be, for example, a conventional liquid crystal display (LCD), LED/OLED display, touchscreen display, mobile media device, and/or any other suitable display known in the art, upon which images may be displayed. In some embodiments, the display 310 may be the MFD and/or the user's mobile media device. The display may be integrated into the marine electronic device 302. In some example embodiments, additional displays may also be included, such as a touch screen display, mobile media device, or any other suitable display known in the art upon which images may be displayed.

In some embodiments, the display 310 may present one or more sets of marine data and/or images generated therefrom. Such marine data may include chart data, radar data, weather data, location data, position data, orientation data, sonar data, and/or any other type of information relevant to the marine vessel. In some embodiments, the display 310 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally, or alternatively, depth information, weather information, radar information, sonar information, and/or any other display inputs may be applied to and/or overlaid onto one another.

In some embodiments, the display 310 and/or user interface may be a screen that is configured to merely present images and not receive user input. In other embodiments, the display and/or user interface may be a user interface such that it is configured to receive user input in some form. For example, the screen may be a touchscreen that enables touch input from a user. Additionally, or alternatively, the user interface may include one or more buttons (not shown) that enable user input.

The user interface 308 may include, for example, a keyboard, keypad, function keys, mouse, scrolling device, input/output ports, touch screen, or any other mechanism by which a user may interface with the system.

In some embodiments, the system 300 may comprise an autopilot navigation 324 that is configured to operate the motor 330 and/or the trolling motor 328 to propel the marine vessel in a direction and at a speed. In some embodiments, the autopilot navigation 324 may direct the marine vessel to a waypoint (e.g., a latitude and longitude coordinate). Additionally, or alternatively, the autopilot may be configured to direct the marine vessel along a route, such as in conjunction with the navigation system. The processor 304 may generate display data based on the autopilot operating mode and cause an indication of the autopilot operating mode to be displayed on the digital display in the first portion, such as an autopilot icon.

In some embodiments, the system 300 may comprise a sonar system 332 including a sonar transducer assembly, which may be any type of sonar transducer (e.g., a downscan transducer, a sidescan transducer, a transducer array (e.g., for forming live sonar), among many others known to one of ordinary skill in the art). The sonar transducer assembly may be housed in the sonar system 332 and configured to gather sonar data from the underwater environment relative to the marine vessel. Accordingly, the processor 304 (such as through execution of computer program code) may be configured to adjust an orientation of the sonar transducer assembly within the sonar system 332 (e.g., according to a fish-on operation) and receive an indication of operation of the sonar transducer assembly. The processor 304 may generate additional display data indicative of the operation of the sonar transducer and cause the display data to be displayed on the digital display. For example, a sonar icon (not shown) may be energized to indicate that the sonar transducer is operating.

In some embodiments, the sonar system 332 may be used to determine depth and bottom topography, detect fish, locate wreckage, etc. Sonar beams, from a sonar transducer assembly, can be transmitted into the underwater environment. The sonar signals reflect off objects in the underwater environment (e.g., fish, structure, sea floor bottom, etc.) and return to the sonar transducer assembly, which converts the sonar returns into sonar data that can be used to produce an image of the underwater environment.

In an example embodiment, the system 300 may include a speed sensor, such as an electromagnetic speed sensor, paddle wheel speed sensor, or the like. The speed sensor may be configured to measure the speed of the marine vessel through the water. The processor 304 may receive speed data from the speed sensor and generate additional display data indicative of the speed of the marine vessel through the water. The speed data may be displayed, such as in text format on the first portion of the digital display. The speed data may be displayed in any relevant unit, such as miles per hour, kilometers per hour, feet per minute, or the like. In some instances, a unit identifier, such as a plurality of LEDs, may be provided in association with the display (may be shown in normal text or with a seven digit display). The processor 304 may cause an LED associated with the appropriate unit for the speed data to be illuminated.

In some embodiments, the system 300 further includes a power source (e.g., battery) that is configured to provide power to the various components. In some embodiments, the power source is rechargeable. In some example embodiments, the system 300 includes a battery sensor. The battery sensor may include a current sensor or voltage sensor configured to measure the current charge of a battery power supply of the system 300 (e.g., the power source). The battery sensor may be configured to measure individual battery cells or measure a battery bank. The processor 304 may receive battery data from the battery sensor and determine the remaining charge on the battery. In an example embodiment, the voltage or current measured by the battery sensor may be compared to a reference value or data table, stored in memory 312, to determine the remaining charge on the battery.

In some embodiments, the system 300 may include other sensors such as accelerometer 326 or other sensors 322. For example, in some embodiments, the system 300 may include an accelerometer 326 for measuring acceleration data, which may be logged by the processor. The acceleration data may be utilized, e.g., for detecting a bite of a fish on a fishing line.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in general context of computer-executable instructions, such as program modules, being executed by a computer. Generally, program modules may include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some instances, program modules may be implemented on separate computing systems and/or devices adapted to communicate with one another. Further, a program module may be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network (e.g., by hard-wired links, wireless links, or combinations thereof). In a distributed computing environment, program modules may be located in both local and remote computer storage media including memory storage devices.

The system 300 may include a computing device or system 318 (e.g., mobile media device) into which implementations of various technologies and techniques described herein may be implemented. Computing device 318 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

In various implementations, each marine electronic device 302 described herein may be referred to as a marine device or as an MFD. The marine electronic device 302 may include one or more components disposed at various locations on a marine vessel. Such components may include one or more data modules, sensors, instrumentation, and/or any other devices known to those skilled in the art that may transmit various types of data to the marine electronic device 302 for processing and/or display. The various types of data transmitted to the marine electronic device 302 may include marine electronics data and/or other data types known to those skilled in the art. The marine data received from the marine electronic device 302 or system 300 may include chart data, sonar data, structure data, radar data, navigation data, position data, heading data, automatic identification system (AIS) data, Doppler data, speed data, course data, or any other type known to those skilled in the art.

In one implementation, the marine electronic device 302 may include a radar sensor for recording the radar data and/or the Doppler data, a compass heading sensor for recording the heading data, and a position sensor for recording the position data. In another implementation, the marine electronic device 302 may include a sonar transducer for recording the sonar data, an AIS transponder for recording the AIS data, a paddlewheel sensor for recording the speed data, and/or the like.

The marine electronic device 302 may receive external data via a LAN or a WAN. In some implementations, external data may relate to information not available from various marine electronics systems. The external data may be retrieved from various sources, such as, e.g., the Internet or any other source. The external data may include atmospheric temperature, atmospheric pressure, tidal data, weather, temperature, moon phase, sunrise, sunset, water levels, historic fishing data, and/or various other fishing and/or trolling related data and information.

The marine electronic device 302 may be attached to various buses and/or networks, such as a National Marine Electronics Association (NMEA) bus or network, for example. The marine electronic device 302 may send or receive data to or from another device attached to the NMEA 2000 bus. For instance, the marine electronic device 302 may transmit commands and receive data from a motor or a sensor using an NMEA 2000 bus. In some implementations, the marine electronic device 302 may be capable of steering a marine vessel and controlling the speed of the marine vessel (e.g., autopilot). For instance, one or more waypoints may be input to the marine electronic device 302, and the marine electronic device 302 may be configured to steer the marine vessel to the one or more waypoints. Further, the marine electronic device 302 may be configured to transmit and/or receive NMEA 2000 compliant messages, messages in a proprietary format that do not interfere with NMEA 2000 compliant messages or devices, and/or messages in any other format. In various other implementations, the marine electronic device 302 may be attached to various other communication buses and/or networks configured to use various other types of protocols that may be accessed via, e.g., NMEA 2000, NMEA 0183, Ethernet, Proprietary wired protocol, etc. In some implementations, the marine electronic device 302 may communicate with various other devices on the marine vessel via wireless communication channels and/or protocols.

In some implementations, the marine electronic device 302 may be connected to a global positioning system (GPS) receiver. The marine electronic device 302 and/or the GPS receiver may be connected via a network interface. In this instance, the GPS receiver may be used to determine position and coordinate data for a marine vessel on which the marine electronic device 302 is disposed. In some instances, the GPS receiver may transmit position coordinate data to the marine electronic device 302. In various other instances, any type of known positioning system may be used to determine and/or provide position coordinate data to/for the marine electronic device 302.

The marine electronic device 302 may be configured as a computing system similar to computing device 318.

Example Flowchart

Embodiments of the present disclosure provide methods for assisting the user with catching a fish. Various examples of the operations performed in accordance with embodiments of the present disclosure will now be provided with reference to FIG. 8.

Figure 8:
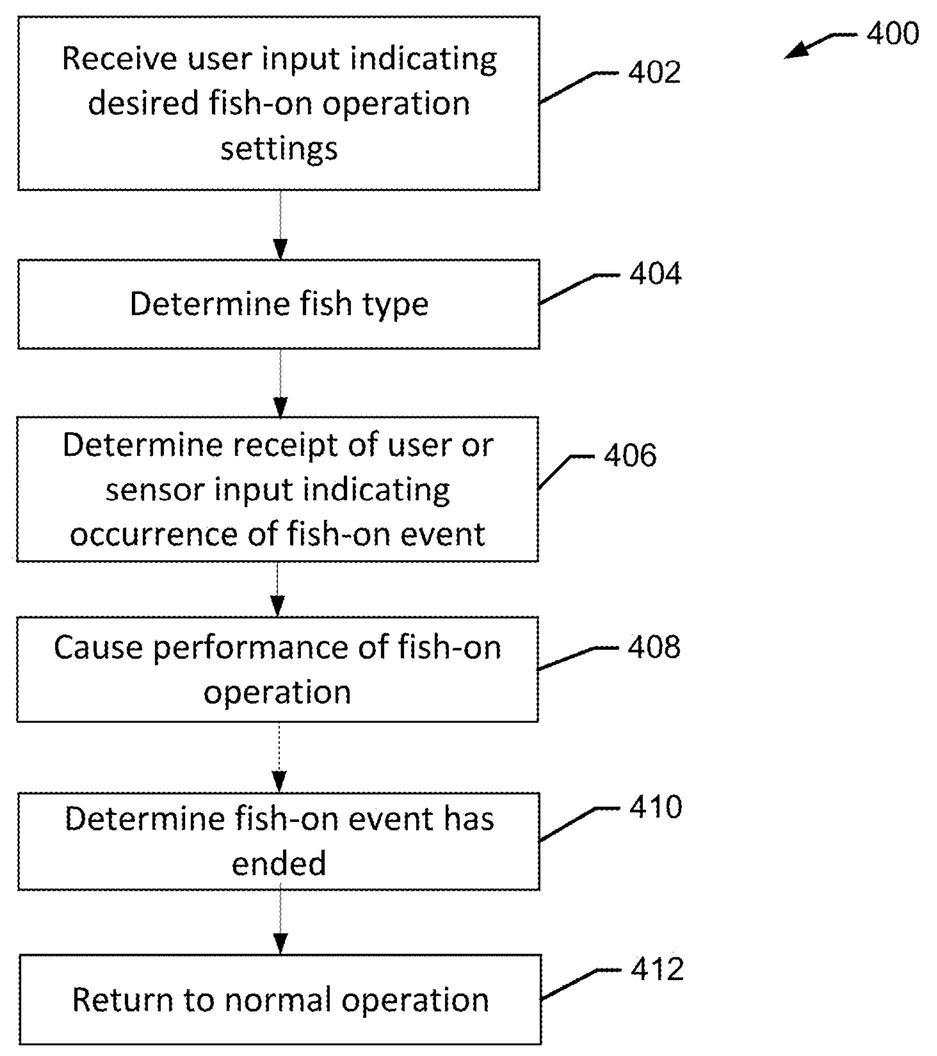
FIG. 8 shows an example method for initiating a fish-on operation, in accordance with some embodiments described herein.

FIG. 8 illustrates a flowchart according to an example method for determining a fish-on event and subsequently causing a watercraft to operate according to a fish-on operation according to an example embodiment 400. The operations illustrated in and described with respect to FIG. 8 may, for example, be performed by, with the assistance of, and/or under the control of one or more of the processor 304, memory 312, communication interface 314, user interface 308, display 310, button or other user input 320, accelerometer 326, computing device 318, remote device 316, sonar system 332, and/or other components described herein.

Operation 402 may comprise receiving user input indicating desired fish-on operation settings (e.g., predetermined route, predetermined speed, camera or video setting, sonar setting, etc.). The processor 304, marine electronic device 302, display 310, and/or computing device 318 may for example, provide means for performing operation 402. Operation 402 may be optional.

Operation 404 may comprise determining a fish type. In some embodiments, operation 404 may comprise determining the fish type based on user input, for example, such as audio user input. In other embodiments, operation 404 may comprise determining the fish type in any other manner. The processor 304, marine electronic device 302, display 310, and/or computing device 318 may for example, provide means for performing operation 404. Operation 404 may be optional.

Operation 406 may comprise determining receipt of user or sensor input indicating occurrence of a fish-on event. For example, the fish-on event may be determined based on a user pressing a button on a necklace, remote, marine electronic device, motor, or elsewhere. Alternatively, the fish-on event may be determined automatically based on detected data such as based on data from an accelerometer satisfying a predetermined threshold. The fish-on event may also be determined based on any other data or user input. The processor 304, marine electronic device 302, display 310, and/or computing device 318 may for example, provide means for performing operation 406.

Operation 408 may comprise causing performance of the fish-on operation. For example, operation 408 may comprise determining which fish-on operation to implement according to the determined fish type from 404 and then implementing the actions of the determined fish-on operation to control the watercraft. Or, in other embodiments, operation 408 may comprise merely implementing actions of a single predetermined fish-on operation to control the watercraft. The actions may include, for example, at least one of altering a speed of the watercraft, altering a direction of the watercraft, altering a rate of change of the speed of the watercraft, altering a direction of a trolling motor, notifying other watercrafts, or engaging an autopilot to navigate the watercraft according to a preset route. The processor 304, marine electronic device 302, display 310, and/or computing device 318 may for example, provide means for performing operation 408.

Operation 410 may comprise determining the fish-on event has ended. For example, operation 410 may include receiving data from an accelerometer and determining that a fish has either been caught or released based on the received data. Alternatively, operation 410 may include receiving user input such as in the form of a button or an audio command that indicates that a fish has been either been caught (e.g., successfully reeled into the watercraft) or released. The processor 304, marine electronic device 302, display 310, and/or computing device 318 may for example, provide means for performing operation 402. Operation 410 may be optional.

Operation 412 may comprise returning to normal operation. For example, once a fish has been caught or released, the method at operation 412 may terminate the fish-on operation and determine that the fish-on event is no longer occurring, causing the processor to return to its previous operating state. The watercraft may return to its previous parameters (e.g., the speed and direction that the watercraft was operating under before the fish-on operation was initiated), or it may return to predetermined standard operating parameters. The processor 304, marine electronic device 302, display 310, and/or computing device 318 may for example, provide means for performing operation 412. Operation 412 may be optional.

FIG. 8 illustrates a flowchart of a system, method, and/or computer program product according to an example embodiment. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 312 and executed by, for example, the processor 304 or controller. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

In some embodiments, the method for operating various marine devices may include additional, optional operations, and/or the operations described above may be modified or augmented.

Conclusion

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A system for controlling a watercraft, the system comprising:

a processor; and a memory including computer executable instructions, the computer executable instructions configured to, when executed by the processor, cause the processor to:

determine receipt of at least one of user input or sensor input indicating occurrence of a fish-on event, wherein the fish-on event corresponds to occurrence of a bite on a fishing line associated with the watercraft; and cause, in response to determination of the receipt of the at least one user input or sensor input indicating the occurrence of the fish-on event, performance of a fish-on operation, wherein the fish-on operation includes at least one of altering a speed of the watercraft, altering a direction of the watercraft, altering a rate of change of the speed of the watercraft, altering a direction of a trolling motor, notifying other watercrafts, or engaging an autopilot to navigate the watercraft according to a preset route, wherein performance of the fish-on operation is designed to aid in a user landing a fish that bit on the fishing line, and wherein the fish-on operation comprises:

causing at least one motor of the watercraft to adjust direction or speed; and causing activation of a sonar system to adjust a direction of the sonar system based on a detected location of the occurrence of the bite on the fishing line, and presenting of a live sonar image based on sonar return data from the sonar system, wherein the live sonar image provides a view of the fish involved with the fish-on event.

2. The system of claim 1, wherein the fish-on operation is determined based on a fish type inputted by a user.

3. The system of claim 2, wherein the fish type is inputted by the user before the occurrence of the fish-on event.

4. The system of claim 2, wherein the fish type is inputted by the user during the occurrence of the fish-on event.

5. The system of claim 1, wherein a degree of altering at least one of the speed of the watercraft, the direction of the watercraft, the rate of change of the speed of the watercraft, or the direction of the trolling motor is based on a fish type inputted by a user.

6. The system of claim 1, wherein the receipt of user input corresponds to a button being pressed.

7. The system of claim 6, wherein the button is attached to the trolling motor or a foot pedal.

8. The system of claim 6, wherein the button is attached to a remote control.

9. The system of claim 1, wherein the receipt of user input corresponds to detecting a predetermined voice command.

10. The system of claim 1, wherein altering the speed of the watercraft comprises reducing the speed of the watercraft.

11. The system of claim 10, wherein altering the speed of the watercraft comprises reducing the speed of the watercraft by at least 10 percent.

12. The system of claim 1, wherein altering the direction of the watercraft comprises causing at least one of the watercraft or the trolling motor to move in a direction that is straight.

13. The system of claim 1, wherein altering the direction of the watercraft includes a turn pattern.

14. The system of claim 13, wherein the turn pattern is time delayed.

15. The system of claim 13, wherein the turn pattern is determined based on at least one of a detected wind condition or chart data indicating at least one of a detected obstacle or a navigation limitation.

16. The system of claim 1, wherein the fish-on operation is determined based on a preset location, and wherein the processor is further configured to:

determine a current location of the watercraft; and determine the fish-on operation based on the current location matching the preset location.

17. The system of claim 1, wherein the sensor input indicating the occurrence of the fish-on event includes input from an accelerometer.

18. A device for controlling a watercraft, the device comprising:

a processor; and a memory including computer executable instructions, the computer executable instructions configured to, when executed by the processor, cause the processor to:

determine receipt of at least one of user input or sensor input indicating occurrence of a fish-on event, wherein the fish-on event corresponds to occurrence of a bite on a fishing line associated with the watercraft; and cause, in response to determination of the receipt of the at least one user input or sensor input indicating the occurrence of the fish-on event, performance of a fish-on operation, wherein the fish-on operation includes at least one of altering a speed of the watercraft, altering a direction of the watercraft, altering a rate of change of the speed of the watercraft, altering a direction of a trolling motor, notifying other watercrafts, or engaging an autopilot to navigate the watercraft according to a preset route, wherein performance of the fish-on operation is designed to aid in a user landing a fish that bit on the fishing line, and wherein the fish-on operation comprises:

causing at least one motor of the watercraft to adjust direction or speed; and causing activation of a sonar system to adjust a direction of the sonar system based on a detected location of the occurrence of the bite on the fishing line, and presenting of a live sonar image based on sonar return data from the sonar system, wherein the live sonar image provides a view of the fish involved with the fish-on event.

19. A method for controlling a watercraft, the method comprising:

determining receipt of at least one of user input or sensor input indicating occurrence of a fish-on event, wherein the fish-on event corresponds to occurrence of a bite on a fishing line associated with the watercraft; and causing, in response to determination of the receipt of the at least one user input or sensor input indicating the occurrence of the fish-on event, performance of a fish-on operation, wherein the fish-on operation includes at least one of altering a speed of the watercraft, altering a direction of the watercraft, altering a rate of change of the speed of the watercraft, altering a direction of a trolling motor, notifying other watercrafts, or engaging an autopilot to navigate the watercraft according to a preset route, wherein performance of the fish-on operation is designed to aid in a user landing a fish that bit on the fishing line, and wherein the fish-on operation comprises:

causing at least one motor of the watercraft to adjust direction or speed; and causing activation of a sonar system to adjust a direction of the sonar system based on a detected location of the occurrence of the bite on the fishing line, and presenting of a live sonar image based on sonar return data from the sonar system, wherein the live sonar image provides a view of the fish involved with the fish-on event.

* * * * *